(12) United States Patent
Koehne et al.

(10) Patent No.: US 10,717,025 B2
(45) Date of Patent: Jul. 21, 2020

(54) DEGASIFYING APPARATUS

(71) Applicant: HYDAC TECHNOLOGY GMBH, Sulzbach/Saar (DE)

(72) Inventors: Jens Holger Koehne, Saarbruecken (DE); Peter Kloft, Ransbach-Baumbach (DE); Herbert Baltes, Losheim (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 225 days.

(21) Appl. No.: 15/769,108

(22) PCT Filed: Sep. 23, 2016

(86) PCT No.: PCT/EP2016/001595
§ 371 (c)(1),
(2) Date: Apr. 18, 2018

(87) PCT Pub. No.: WO2017/080626
PCT Pub. Date: May 18, 2017

(65) Prior Publication Data
US 2018/0304174 A1 Oct. 25, 2018

(30) Foreign Application Priority Data

Nov. 10, 2015 (DE) .......................... 10 2015 014 496

(51) Int. Cl.
*B01D 19/00* (2006.01)
*B60K 6/12* (2006.01)
(Continued)

(52) U.S. Cl.
CPC ....... *B01D 19/0031* (2013.01); *B01D 63/063* (2013.01); *B01D 69/02* (2013.01);
(Continued)

(58) Field of Classification Search
CPC .............. B01D 19/0031; B01D 53/228; B01D 63/063; B01D 69/02; B01D 69/10;
(Continued)

(56) References Cited

U.S. PATENT DOCUMENTS 5,326,386 A * 7/1994 Lee ..................... B01D 19/0031
96/12
6,402,810 B1 * 6/2002 Mayer ................... F15B 21/044
210/640

(Continued)

FOREIGN PATENT DOCUMENTS

| DE | 10 2008 062 836 | 8/2010 | |
| DE | 10 2013 210 417 | 12/2017 | |
| JP | 9-262406 | * 10/1997 | ............. B01D 19/00 |

OTHER PUBLICATIONS

English language machine translation for JP 9-262406. Retrieved from http://translationportal.epo.org dated Jan. 23, 2020. (Year: 2020).*

(Continued)

*Primary Examiner* — Jason M Greene
(74) *Attorney, Agent, or Firm* — Wenderoth, Lind & Ponack, L.L.P.

(57) ABSTRACT

Degasifying apparatus is for eliminating gases, such as ambient air, from fluids, such as oil. The apparatus has at least one permeable membrane (26) that lets the gas to be eliminated from the fluid (22) penetrate through the permeable membrane and retains the liquid moiety of the fluid within the permeable membrane.

17 Claims, 5 Drawing Sheets

(51) Int. Cl.
  *F16H 61/4096* (2010.01)
  *F16H 61/4174* (2010.01)
  *B01D 63/06* (2006.01)
  *B01D 69/02* (2006.01)
  *B01D 69/10* (2006.01)
  *B01D 71/70* (2006.01)
  *F15B 21/044* (2019.01)

(52) U.S. Cl.
  CPC ............. *B01D 69/10* (2013.01); *B01D 71/70* (2013.01); *B60K 6/12* (2013.01); *F16H 61/4096* (2013.01); *F16H 61/4174* (2013.01); *B01D 2325/20* (2013.01); *F15B 21/044* (2013.01); *F15B 2211/20569* (2013.01); *F15B 2211/212* (2013.01)

(58) Field of Classification Search
  CPC .................. B01D 71/70; F15B 21/044; F15B 2211/20569; F15B 2211/212; F16H 61/4096; F16H 61/4174; B60K 6/12
  See application file for complete search history.

(56) References Cited

U.S. PATENT DOCUMENTS

| | | | |
|---|---|---|---|
| 2005/0257844 A1* | 11/2005 | Draper | F15B 21/044 |
| | | | 138/30 |
| 2010/0132545 A1* | 6/2010 | Hummelt | B01D 19/0031 |
| | | | 95/46 |
| 2011/0314801 A1 | 12/2011 | Baltes et al. | |
| 2015/0047506 A1 | 2/2015 | Curello et al. | |
| 2016/0008740 A1* | 1/2016 | Jensen | B01D 19/0031 |
| | | | 95/266 |

OTHER PUBLICATIONS

International Search Report (ISR) dated Dec. 8, 2016 in International (PCT) Application No. PCT/EP2016/001595.

\* cited by examiner

DEGASIFYING APPARATUS

FIELD OF THE INVENTION

The invention relates to a degasifying apparatus for eliminating gases such as ambient air from fluids such as oil.

BACKGROUND OF THE INVENTION

Air may be present in dissolved and in undissolved forms in pressure fluids such as hydraulic fluids. Although dissolved air is not visible in the fluid or oil, it is always present to a certain extent. Undissolved air is not always present in the fluid or oil, but when it is, it is visible as a second phase. Although the properties of pressure fluids, such as viscosity, compression modulus, and lubricating capacity, are substantially impaired by undissolved air, dissolved air also affects certain properties of the pressure fluid, for example ageing behavior and cavitation tendency.

The maximum amount of air that can be dissolved in the fluid concerned is determined by the saturation curve of the fluid concerned. However, in principle, solubility increases with increasing pressure and to a lesser extent is also dependent on temperature. Because pressures and temperatures in hydraulic systems vary over time, as well as according to location, a drop in pressure and consequent lowering of the solubility limit can result in air dissolving out during operation. As a result, the formation of a second phase (bubbles), and thus damage, for example by flow cavitation, can be expected, especially in areas of low static pressure, such as control cross sections of valves. Because the outgassing rate is greater than the dissolution rate, resulting air bubbles remain even when the pressure in the fluid increases again, thereby altering the properties of the pressure fluid on the one hand and possibly resulting in damages due to cavitation erosion upon a subsequent pressure increase on the other hand. In order to ensure reliable operation of hydraulic systems, it is necessary to take measures for degasifying the pressure fluid. Vacuum evaporation is the process currently employed for achieving a particularly effective degasification, in which the degassed fluid contains only a small residual contamination. Although this has the advantage that water is simultaneously eliminated, the very high energy requirement and the elaborate construction of the apparatus are disadvantageous. In addition there is usually an undesired heating of the fluid. Also, it is not possible to integrate the degasifying apparatus in a main fluid flow of the fluid system.

SUMMARY OF THE INVENTION

In view of these problems, an object of the invention is to provide an improved, simple and cost-effectively operable degasifying apparatus for fluids such as hydraulic fluid.

According to the invention, this object is basically achieved by a degasifying apparatus that provides a permeation process for desgasifying, which takes place through a membrane. For separation, use is made of a dense membrane without pores, through which a diffusion process takes place. In comparison to other desgasifying techniques such as vacuum evaporation, the diffusion process can be carried out with very little energy use, as only a partial pressure gradient at the membrane is needed as a driving force. For desgasifying pressure fluids such as hydraulic fluid in hydraulic systems, the available pressure in the system can be used to increase the partial pressure differential. By the apparatus according to the invention, in which the degasifying is effected by allowing the fluid to flow over a membrane, the degasifying process can be advantageously carried out within the system, namely in a bypass of the pressure system as well as in a main volume flow of the system.

The permeable membrane used in the apparatus according to the invention can comprise a silicone material, and can preferably be composed entirely of silicone.

In particularly advantageous exemplary embodiments, a support body composed of a wire gauze, a sintered metal, a ceramic, or other structure. Each of those support bodies has passages or pores, with the free cross sections permitting a gas passage, and is provided for supporting the permeable membrane.

The permeable membrane with its support body can separate a fluid side from a gas side in a container, or the membrane can comprise a fluid guide. In this manner, the degasifying process can take place on a volume flow of a hydraulic system, flowing through a conduit encased by the tubular support body, against the inside of which the permeable membrane that separates the free cross section of the conduit from the exterior support body in a fluid-tight manner rests.

In advantageous exemplary embodiments, the permeation coefficient Q of the silicone membrane is 200 to 600×10$^{-17}$ m$^2$/s/Pa, preferably in the range of values from 300 to 400×10$^{-17}$ m$^2$/s/Pa, and particularly preferably in the range of values from 370 to 380×10$^{-17}$ m$^2$/s/Pa. Silopren®LSR 2640 is a commercially available silicone rubber that can be advantageously used as a silicone membrane.

With particular advantage, the degasifying apparatus can be integrated in a hydraulic system comprising low pressure and high pressure hydraulic accumulators. The accumulators are hooked up or connected as an energy recovery device on the gas side to a hydrostatic drive, which preferably enables a four quadrant mode of operation. The permeable membrane degasifies the fluid on the low pressure side of the energy recovery device.

With particular advantage, the low pressure side of the energy recovery device is hooked up or connected to the container with the permeable membrane on the fluid inlet side of that container. The fluid outlet side of the container is hooked up or connected to a transport device in the form of a spring-loaded differential piston pump or a Venturi nozzle. The degasifying apparatus then forms a bypass to the low-pressure side of the energy recovery device.

In order to actuate the spring-loaded differential pressure pump, the larger piston face thereof can be subjected to the pressure of the low-pressure side of the low-pressure accumulator. The system pressure of the low-pressure side then supplies the drive for the transport device.

The gas side of the container can have ambient pressure or it can be hooked up or connected to a suction device, which increases the partial pressure differential on the membrane.

In particularly advantageous fashion, this suction device can have another spring-loaded differential piston pump. The larger piston face of that pump can be subjected to the pressure of the low pressure side of the low pressure accumulator for actuation. The movement of the pump piston is pressure-synchronized with the first differential piston pump. The system pressure of the low-pressure side then also supplies the drive for the suction device.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
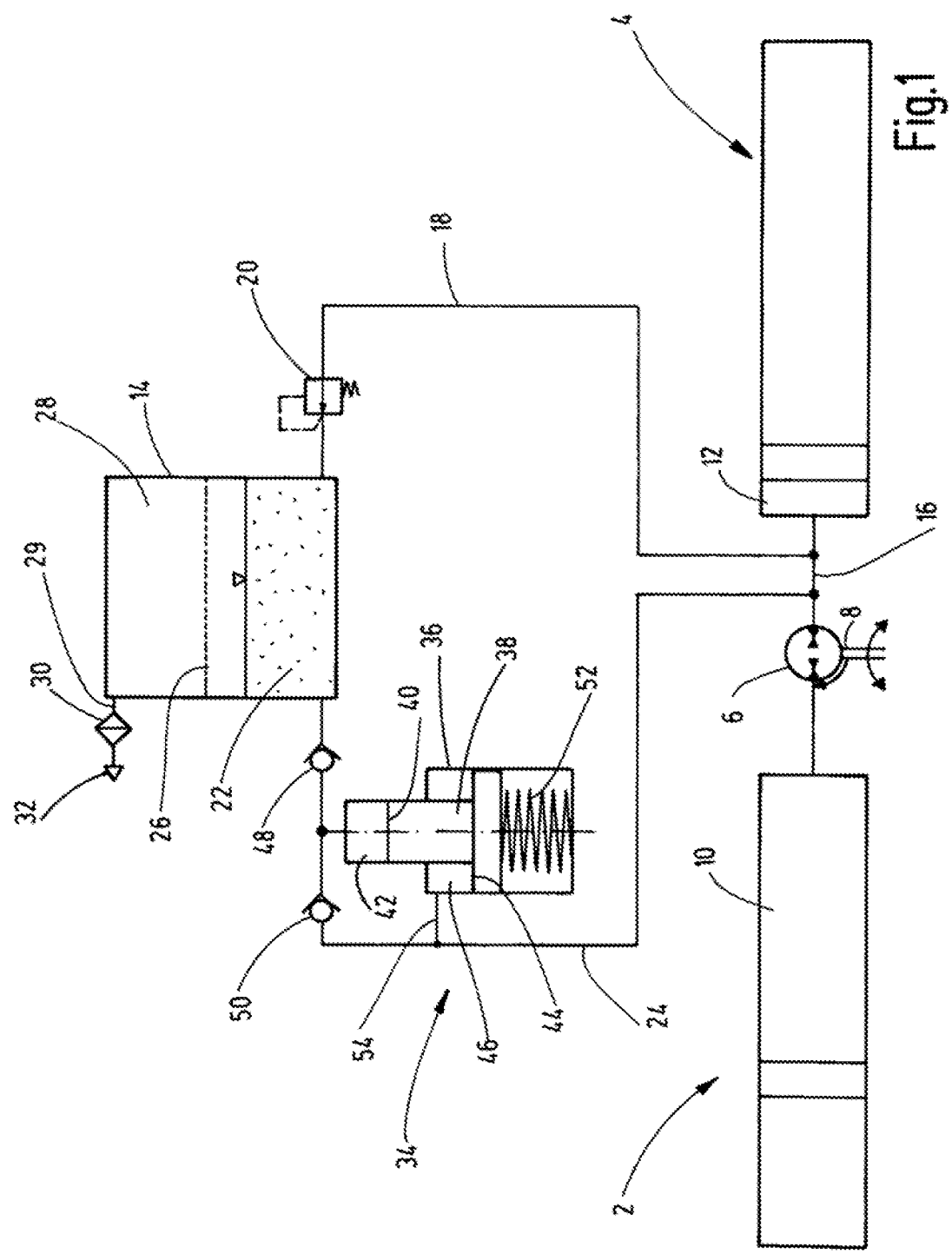
FIG. 1 is a schematically simplified and symbolically depicted hydraulic circuit diagram of a first exemplary embodiment of a degasifying apparatus according to the invention.

With reference to FIGS. 1-4 of the drawings, the invention is explained with examples, in which the degasifying apparatus is a component of the energy recovery device in a hydrostatic drive system. As disclosed in DE 10 2008 062 836 B3, which shows an example of such a drive system, such systems have, in combination with a hydropneumatic high-pressure accumulator 2 and a hydropneumatic low-pressure accumulator 4, a swivel-mounted four quadrants drive 6, which is coupled to a wheel drive via a shaft 8. The high-pressure accumulator 2 and the low-pressure accumulator 4 are connected by their oil sides 10 and 12, respectively, to the four-quadrants drive 6. Drive 6 charges the high pressure accumulator 2 during braking processes in the pump mode for storing braking energy, and for acceleration processes functions as a hydraulic motor, which is driven by the pressure fluid of the high-pressure accumulator. Depressurized fluid arrives from the hydraulic motor at the low-pressure accumulator 4. The low pressure accumulator 4 in turn supplies the fluid volume for the braking energy-storing charging processes of the high pressure accumulator 2. In operation, the pressure in the low-pressure accumulator 4 varies between about 3 bar and about 15 bar during these working cycles of the energy recovery devices.

In these exemplary embodiments, the associated degasifying apparatus according to the invention has a container 14. Fluid 22 to be degasified can be conducted to container 14 from the low pressure side 16 of the energy recovery device via a line 18, which opens into the bottom of the container 14 via a pressure relief valve 20. From the container 14, the fluid 22 can be returned to the low-pressure side 16 via another line 24. In this arrangement, the degasifying apparatus forms a bypass to the low-pressure side 16 of the associated system.

In the container 14, a membrane 26 separates the chamber containing the fluid 22 to be degasified from a chamber 28 that receives the gaseous phase that has passed through the membrane 26 by diffusion. From the top side of the chamber 28, this air that has been degassed from the fluid 22 passes to the surroundings 32 via a line 29 and via a venting filter 30. The pressure relief valve 20 is set to a value at which the acting pressure of the low-pressure side 16 is reduced to a value that corresponds to the partial pressure gradient at the membrane 26 desired for the diffusion process, in other words the pressure gradient relative to the ambient pressure prevailing in the chamber 28.

A transport device 34 is situated in the line 24 that is provided for the return flow of the fluid 22 from the container 14 to the low-pressure side. In the example of FIG. 1, this device has a differential piston pump 36. The smaller piston face 40 of its differential piston 38 is guided in a displacement chamber 42 for the fluid 22 to be transported. The larger piston face 44 is guided in a drive chamber 46. The displacement chamber 42 is connected to the bottom of the container 14 via a check valve 48 acting as a suction valve and to the line 24 leading back to the low pressure side 16 via a check valve 50 acting as a pressure valve. A compression spring 52 pretensions the differential piston 38 in the direction for reducing the volume of the displacement chamber 42. The pressure of the low-pressure side 16 of the system is applied to the drive chamber 46 and then to the larger piston face 44 via a branch 54. The action of the compression spring 52 is selected such that during operation phases, in which the pressure of the low pressure side 16 is below a threshold value, the compression spring 52 moves the piston 38 for reducing the volume of the displacement chamber 42. In operation phases in which the pressure of the low pressure side 16 exceeds the given value, the pressure in the drive chamber 46 moves the piston 38 against the action of the compression spring 52, resulting in a working cycle of the piston pump 36 for alternating operation phases, causing the fluid 22 to be degassed to flow through the container 14.

Figure 2:
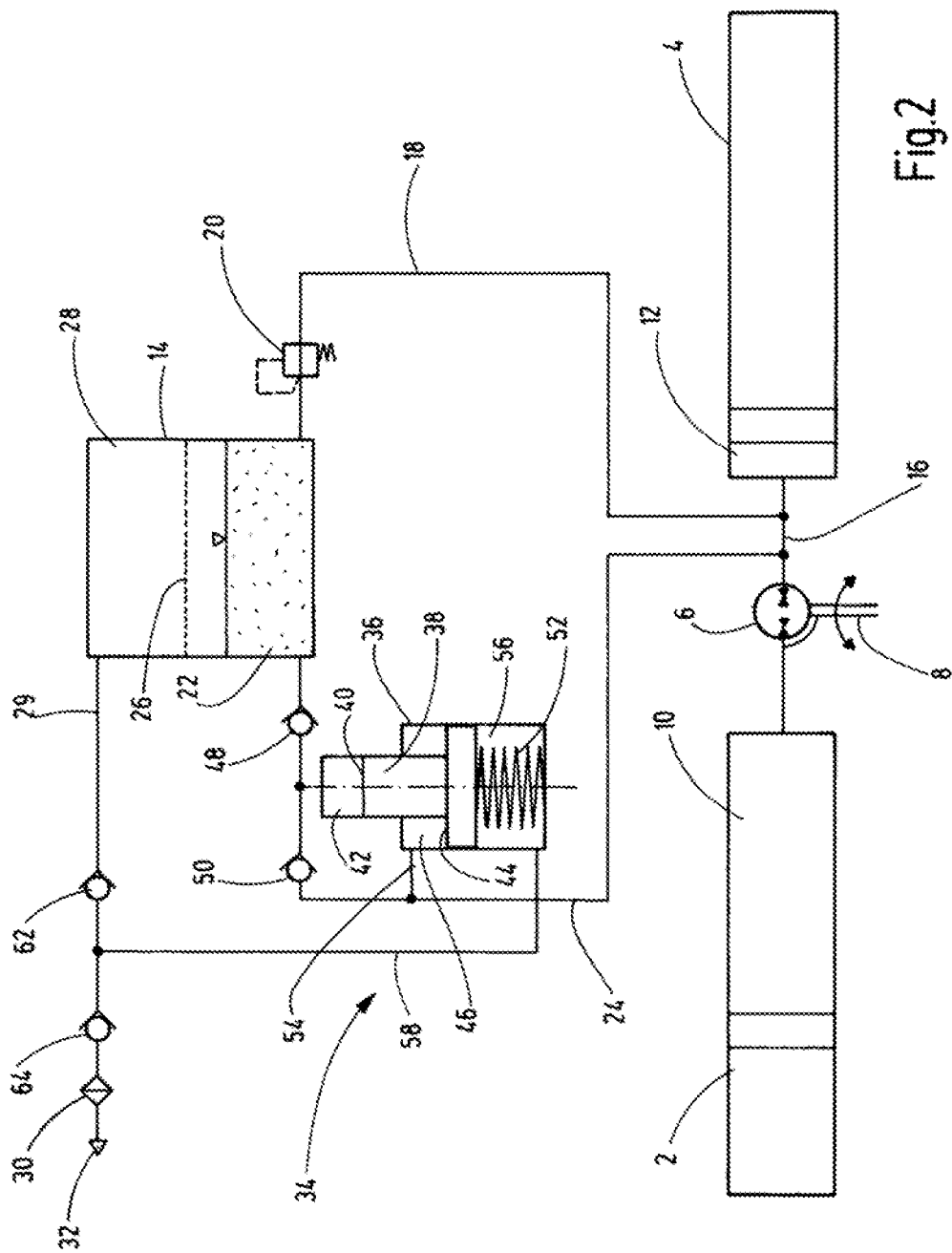
FIGS. 2-4 are schematically simplified and symbolically depicted hydraulic degasifying apparatus circuit diagrams for second, third, and fourth exemplary embodiments according to the invention, respectively.

The exemplary embodiment of FIG. 2 differs from the first example only in that air, which is displaced by movements of the differential piston 38 from the chamber 56 of the piston pump 36 containing the compression spring 52 and which is possibly contaminated with lubricants, does not reach the surroundings without being filtered. Hence a line 58 is hooked up or connected to this chamber 56, which line is connected to the line 29 that vents the degassed air from the chamber 28 of the container 14. The line 58 is connected to the line 29 between two check valves 62 and 64, which each open to the surroundings 32 when actuated by pressure. In this arrangement, the differential piston pump 36 not only forms the transport device 34 for transporting the fluid, but also simultaneously forms a suction device that creates a negative pressure in the line 58 during piston movements in which the volume of the chamber 56 containing the compression spring 52 increases. The negative pressure also acts, via the check valve 62 opening thereunder and via the line 29, in the chamber 28 of the container 14 and then on the membrane 26.

Figure 3:
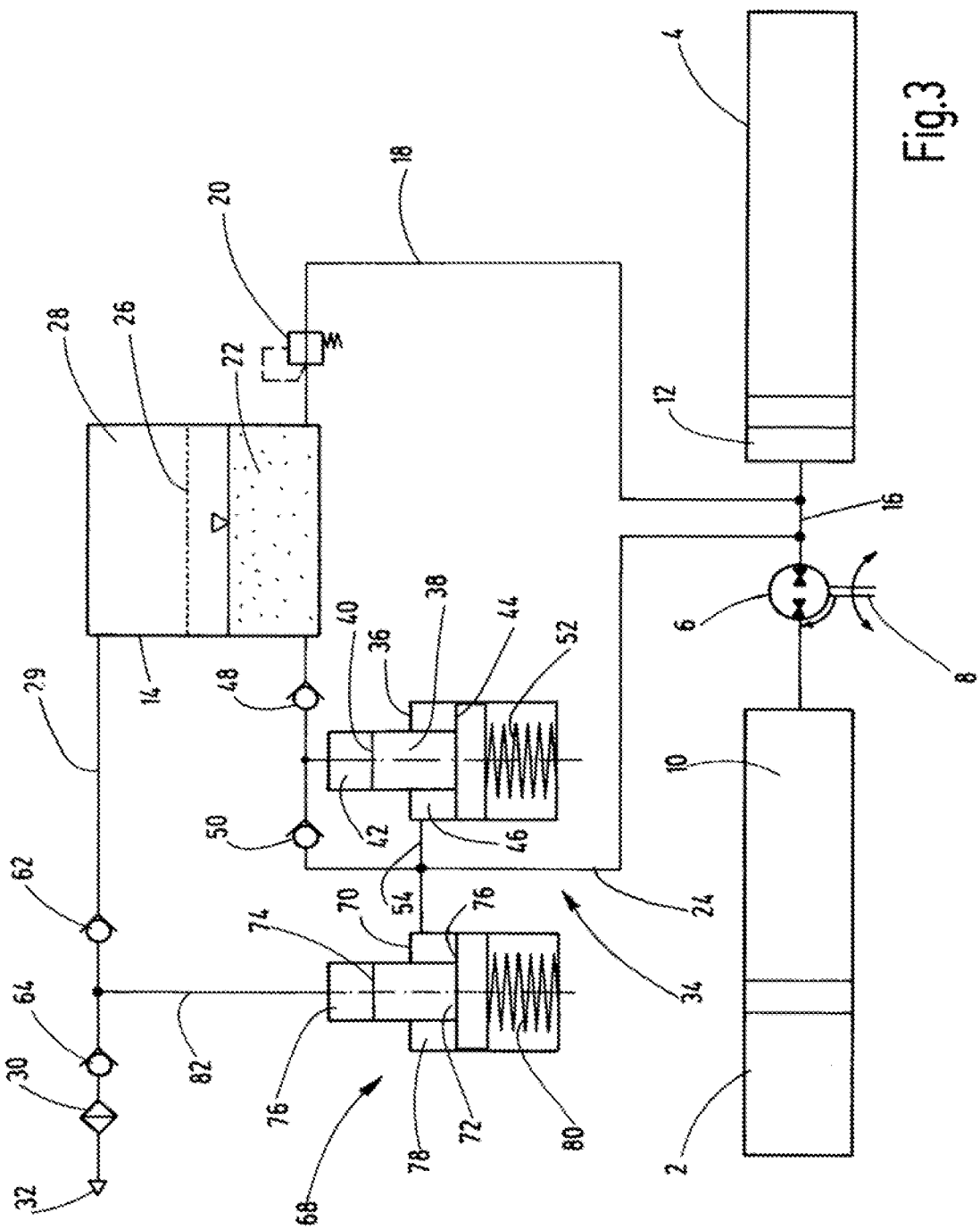

Besides the differential piston pump 36 that forms the transport device 34, a second differential piston pump 70 is provided as a suction device 68 in the exemplary embodiment of FIG. 3. As is the case with the first piston pump 36, the smaller piston face 74 of the differential piston 72 acts in a displacement chamber 76, whereas the larger piston face 76 moves in a drive chamber 78. The drive chamber 78, like the drive chamber 46 of the first piston pump 36, is subjected to the pressure of the lower pressure side 16. As is the case with the first piston pump 36, the piston 72 is pretensioned by a compression spring 80 for a movement that reduces the volume of the drive chamber 78. In this arrangement, the second piston pump 70 with its displacement chamber 76, which is connected via a suction line 82 to the line 29 at a point situated between the check valves 62 and 64, acts as a suction pump, creating a negative pressure in the line 29 and then on the membrane 26 located in the container 14.

Figure 4:
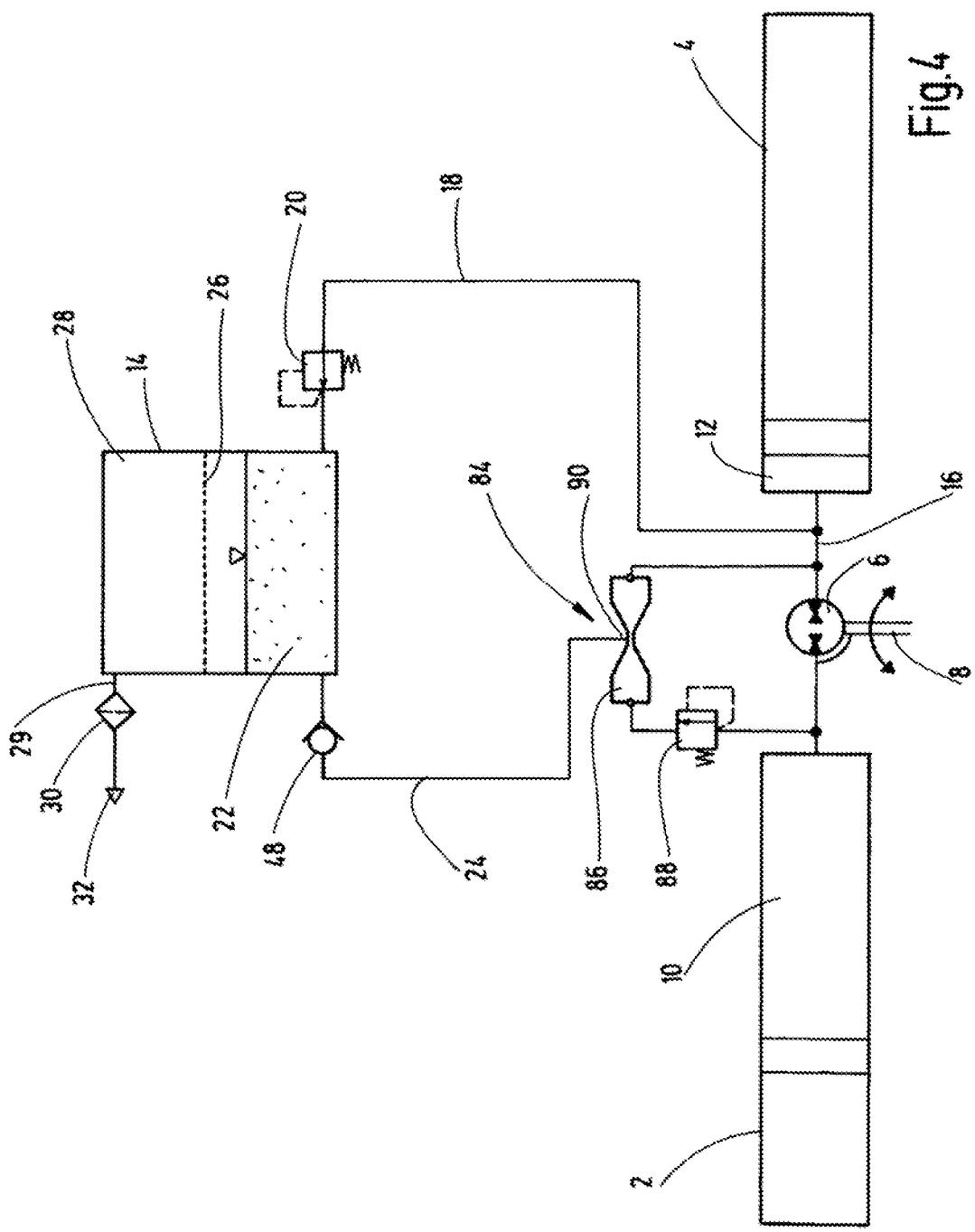

FIG. 4 shows a fourth exemplary embodiment in which the transport device 84 has a Venturi nozzle 86, through which, in a bypass to the four quadrants drive 6, a volume flow flows from the oil side 10 of the high-pressure accumulator 2 to the low-pressure side 16. The volume flow is limited to a low intensity by a pressure reducing valve 88, namely to a value that suffices for creating a negative pressure at the suction port 90 of the Venturi nozzle 86, leading to an outflow of degassed fluid 22 via the line 24 to the low pressure side 16.

Figure 5:
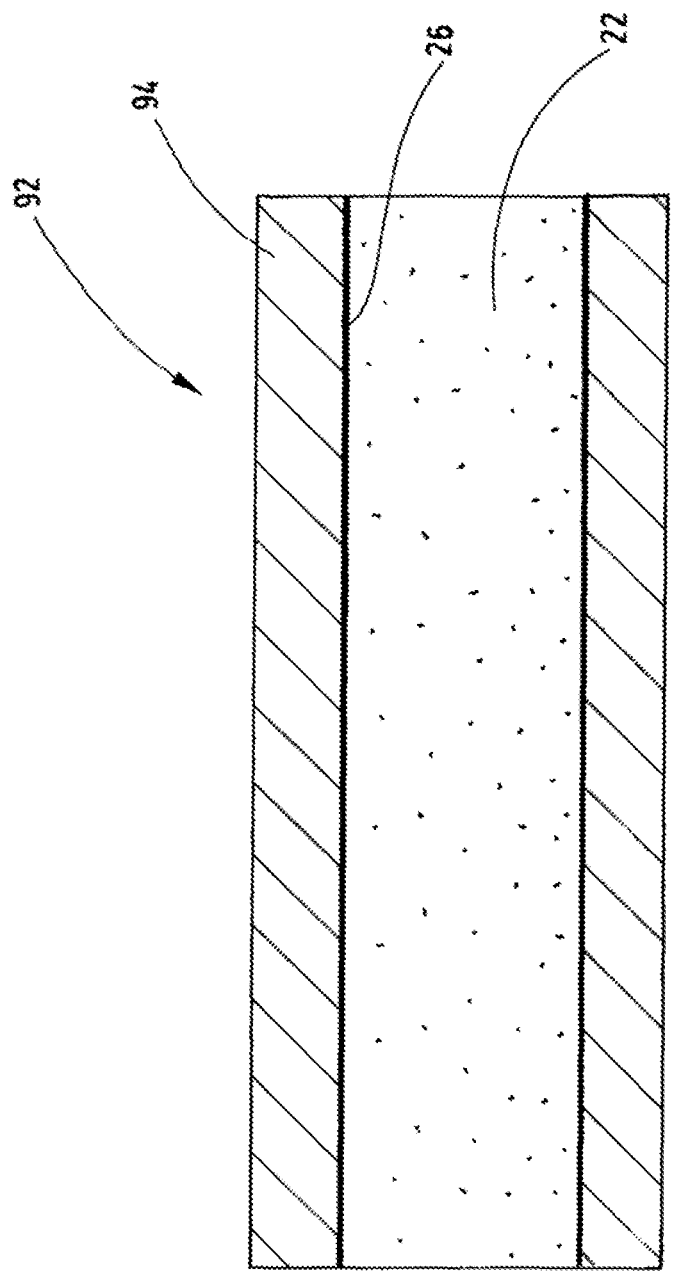
FIG. 5 is a side view in section of a pipe section of a fluid guide of a degasifying apparatus according to a fifth exemplary embodiment of the invention.

The fifth exemplary embodiment of FIG. 5 enables a degasifying within a fluid guide of a (not shown) fluid system. In this case, the membrane 26 forms the fluid-tight casing of the interior of a pipe section 92. The outer pipe wall of pipe section 92 forms a support body 94 for the membrane 26. The inside of membrane 26 is acted on by the pressure of the fluid 22 to be degassed. In this example, this support body 94 is formed by a sintered metal, which has a porosity permitting air to permeate. Instead of a sintered metal, a wire gauze, a porous ceramic material, or any other structure that has passages or pores for gas penetration could be provided as a material for the support body 94.

As in the examples described above, the membrane 26 can advantageously be made of a silicone material having a thickness of 1 mm to 2 mm, for example Silopren®LSR 2640. The thickness of the material is selected such that the permeation coefficient Q lies in an advantageous range of values, preferably in the range of between 370 and 380×$10^{-17}$ m$^2$/s/Pa.

While various embodiments have been chosen to illustrate the invention, it will be understood by those skilled in the art that various changes and modifications can be made therein without departing from the scope of the invention as defined in the claims.

The invention claimed is:

1. A degasifying apparatus for eliminating a gas from a fluid having the gas in a liquid, the degasifying apparatus comprising:
    a container having a permeable membrane separating a gas chamber from a fluid chamber in said container, said permeable membrane allowing the gas to be removed from the fluid in the fluid chamber to pass through said permeable membrane into said gas chamber and retaining the liquid of the fluid in the fluid chamber without passing through said permeable membrane, said fluid chamber having a fluid inlet and a fluid outlet;
    an energy recovery device including low-pressure and high-pressure accumulators connected to liquid sides thereof to a hydrostatic drive, said fluid chamber being connected in fluid communication with said liquid side of said low-pressure accumulator to degasify the fluid on a low-pressure side of said energy recovery device; and
    a transport device connected in fluid communication with said fluid outlet between said container and said liquid side of said low-pressure accumulator, said transport device being a spring-loaded differential piston pump or a Venturi nozzle.

2. A degasifying apparatus according to claim 1 wherein said transport device is said spring-loaded differential piston pump operable in a four-quadrant mode.

3. The degasifying apparatus according to claim 1 wherein
    the gas is air; and
    the liquid is oil.

4. The degasifying apparatus according to claim 1 wherein
    said permeable membrane comprises a silicone material.

5. The degasifying apparatus according to claim 1 wherein
    said permeable membrane consists entirely of silicone.

6. The degasifying apparatus according to claim 1 wherein
    said permeable membrane rests against a support body having passages or pores with free cross sections permitting gas to permeate through said support body.

7. The degasifying apparatus according to claim 6 wherein
    said support body is at least one of a wire gauze, a sintered metal, a plastic material or a ceramic material.

8. The degasifying apparatus according to claim 6 wherein
    said support body and said permeable membrane comprises a fluid guide.

9. The degasifying apparatus according to claim 1 wherein
    said permeable membrane has a permeation coefficient value between 200 and 600×$10^{-17}$ m$^2$/s/Pa.

10. The degasifying apparatus according to claim 9 wherein
    said permeable membrane has a permeation coefficient value between 300 and 400×$10^{-17}$ m$^2$/s/Pa.

11. The degasifying apparatus according to claim 10 wherein
    said permeable membrane has a permeation coefficient value between 370 and 380×$10^{-17}$ m$^2$/s/Pa.

12. The degasifying apparatus according to claim 1 wherein
    said transport device is a first spring-loaded differential piston pump having a piston with a larger piston face subjected to pressure of said low-pressure accumulator.

13. The degasifying apparatus according to claim 1 wherein
    said gas chamber of said container has ambient pressure therein.

14. The degasifying apparatus according to claim 1 wherein
    said gas chamber of said container is connected in fluid communication to a suction device.

15. The degasifying apparatus according to claim 14 wherein
    said transport device is a first spring-loaded differential piston pump having a piston with a larger piston face subjected to pressure of said low-pressure accumulator; and
    said suction device comprises a second spring-loaded differential piston pump having a piston with a larger piston face subjected to pressure of said low-pressure piston accumulator and being pressure-synchronized with said first spring-loaded differential piston pump in movement thereof.

16. The degasifying apparatus according to claim 1 wherein
    said transfer device is a Venturi nozzle.

17. The degasifying apparatus according to claim 11 wherein
    said Venturi nozzle is connected in fluid communication to said low-pressure accumulator, said high-pressure accumulator and said fluid chamber.

* * * * *